United States Patent [19]

Stefansky

[11] Patent Number: 5,329,412
[45] Date of Patent: Jul. 12, 1994

[54] TWO AND ONE HALF INCH DIAMETER DISK DRIVE HAVING 0.6 INCH HEIGHT

[75] Inventor: Frederick M. Stefansky, Longmont, Colo.

[73] Assignee: Conner Peripherals, Inc., San Jose, Calif.

[21] Appl. No.: 111,286

[22] Filed: Aug. 24, 1993

Related U.S. Application Data

[63] Continuation of Ser. No. 661,065, Feb. 26, 1991, abandoned, which is a continuation-in-part of Ser. No. 531,788, Jun. 11, 1990, abandoned.

[51] Int. Cl.⁵ .......................................... G11B 5/012
[52] U.S. Cl. ................................ 360/97.01; 360/105
[58] Field of Search ............................. 360/105-106, 360/98.01, 97.01-97.03

[56] References Cited

U.S. PATENT DOCUMENTS 5,023,736 6/1991 Kelsic ................................. 360/105
5,034,837 7/1991 Schmitz .............................. 360/105

FOREIGN PATENT DOCUMENTS 59-221873 12/1984 Japan ............................... 360/97.03

Primary Examiner—A. J. Heinz
Attorney, Agent, or Firm—Fliesler, Dubb, Meyer & Lovejoy

[57] ABSTRACT

A two and one half inch form factor single disk drive has a height of 0.60. The spin motor is mounted in a recess in a housing base to reduce height of the housing. A printed circuit board is mounted to the base with all components of the circuit board being mounted on one side of the board opposite from the base. The cover and base are preferably made of cast aluminum alloy with the cover being convex configured for added strength.

13 Claims, 7 Drawing Sheets

TWO AND ONE HALF INCH DIAMETER DISK DRIVE HAVING 0.6 INCH HEIGHT

CROSS REFERENCE TO RELATED APPLICATION

This application is a file wrapper continuation of Ser. No. 07/661,065, filed Feb. 26, 1991, now abandoned, which application is a continuation-in-part of co-pending application Ser. No. 07/531,788 filed Jun. 11, 1990 for TWO AND ONE HALF INCH DIAMETER MULTIPLE DISK DRIVE, now abandoned, and is related to the following copending applications assigned to the present assignee:

ARCHITECTURE FOR A 2½ INCH DIAMETER SINGLE DISK DRIVE, Ser. No. 07/378,149, filed Nov. 16, 1992, which is a file wrapper continuation of application Ser. No. 07/865,704, filed Apr. 6, 1992, which is a file wrapper continuation of application Ser. No. 07/746,139, filed Aug. 13, 1991, which is a file wrapper continuation of application Ser. No. 07/508,960, filed Apr. 12, 1990, which is a file wrapper continuation of application Ser. No. 07/416,108, filed Oct. 12, 1989, which is a continuation-in-part of application Ser. No. 07/387,944, filed Jul. 31, 1989;

DISK DRIVE SYSTEM CONTROL ARCHITECTURE, application Ser. No. 07/572,168, which issued as U.S. Pat. No. 4,979,056, and is a file wrapper continuation of application Ser. No. 07/057,289, filed Jun. 2, 1987;

DISK DRIVE SOFTWARE SYSTEM ARCHITECTURE, application Ser. No. 07/790,008, filed Nov. 4, 1991, which is a file wrapper continuation of application Ser. No. 07/488,386, filed Feb. 23, 1990, which is a file wrapper continuation of application Ser. No. 07/057,806, filed Jun. 2, 1987;

LOW-POWER, HARD DISK DRIVE SYSTEM ARCHITECTURE, application Ser. No. 07/564,693, filed Aug. 7, 1990, which is a file wrapper continuation of application Ser. No. 07/152,069, filed Feb. 4, 1987;

MAGNETIC PARKING DEVICE FOR DISK DRIVE, U.S. Pat. No. 5,170,300, which issued from application Ser. No. 07/643,703, which is a file wrapper continuation of application Ser. No. 07/269,873, filed Nov. 10, 1988; and DISK DRIVE SYSTEM USING MULTIPLE EMBEDDED QUADRATURE SERVO FIELDS, application Ser. No. 07/860,299, which is a file wrapper continuation of application Ser. No. 07/780,433, which is a file wrapper continuation of application Ser. No. 07/386,504, filed Jul. 27, 1989.

Each of these related application is hereby incorporated by reference.

BACKGROUND OF THE INVENTION

This invention relates generally to magnetic disk drives, and more particularly the invention relates to a single disk drive which has increased storage capacity and reduced size, weight and power consumption and conforms to the dimensions of a tape cassette having a height of 0.6 inch.

The technology relating to data storage is following a continuing trend towards increased storage capacity, reduced data storage device weight and size, and reduced power consumption. Factors motivating these trends include the increasing use of portable, lap-top, and notebook computers. Reducing the size of disk drives has been balanced against the corresponding reduction in storage capacity caused by reduction in the area of the storage medium.

Advances in data storage technology and the reduced size of computers have lead to disk drives having smaller dimensions. Eight inch (8") disk drives were followed by the five and one-quarter inch (5¼") disk drives. The length of a five and one-fourth inch drive is approximately the width of an eight inch drive and the width of a five and a quarter inch drive is approximately one-half the length of an eight inch drive. This same relationship applies to so called three and one-half inch (3½") drives and five and one-fourth drives—i.e. a three and one-half inch drive is approximately one-half the size of five and one-fourth inch drive.

Many of the developments in disk drive technology which lead to the current state of the art for disk drives for personal computers and work stations were made with respect to five and one-fourth inch disk drives and later incorporated into three and one-half inch disk drives. In transferring these developments from five and one-quarter inch to three and one-half inch drives, most parts remain the same and were shoe-horned into a three and one-half inch drive.

Disclosed in co-pending application Ser. No. 508,960 supra, is a disk drive having a two and one-half inch (2½") form factor in which the length of the drive is approximately the width of a three and one-half inch drive and the width is approximately one-half of the length of a three and one-half inch drive. The dimensions of the disk drive are: length 4 inches, width 2¾ inch, and height approximately 0.68 inch. One embodiment of the disk drive weights less than approximately six (6) ounces, and the single disk in the drive has a diameter of approximately 2.56 inches.

The overall power consumption of the disk drive is less than 3.5 watts and the power consumption may be as low as 1.5 watts during idle periods. Thus, the disk drive is idle for use in portable or other battery powered computers. The power consumption of the disk drive is further reduced by the use of a sleep mode to less than 0.5 watt. A closed loop, embedded servo control system provides the single two and one-half inch diameter disk with a storage capacity of 20 Mb.

Co-pending parent application Ser. No. 07/531,788 is directed to a two and one-half inch diameter disk drive having the form factor 2¾"×4"×0.75" with enhanced storage capacity provided by multiple disks.

SUMMARY OF THE INVENTION

Accordingly, an object of the present invention is a two and one-half inch diameter disk drive having enhanced storage capacity.

Another object of the invention is a disk drive having an enhanced vibration and shock resistance for hard disks.

Yet another object of the invention is a portable disk drive for use with lap-top and notebook computers which is light in weight and low in power consumption.

Still another object of the invention is a portable disk drive for lap-top and notebook computers with enhanced ruggedness.

A feature of the invention is cast aluminum alloy base and cover.

Another feature of the invention is a cover having a configuration to enhance the rigidity and strength thereof.

Still another feature of the invention is a hard disk drive having the form factor of a tape cassette including 0.6 inch height.

The invention and objects and features thereof will be more readily apparent from the following detailed description and appended claims when taken with the drawing.

DETAILED DESCRIPTION OF ILLUSTRATIVE EMBODIMENTS

Figure 1:
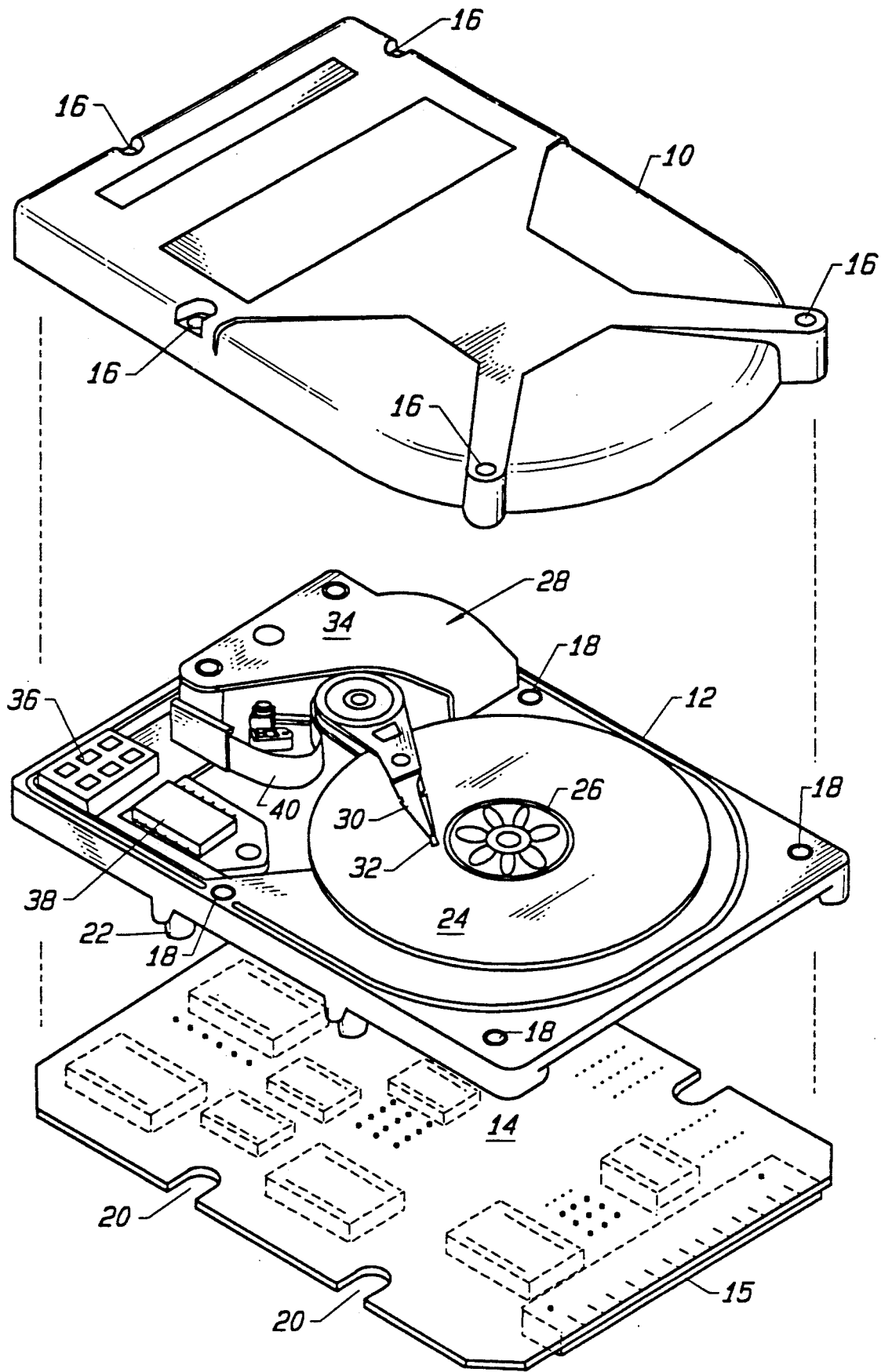
FIG. 1 is an exploded perspective view of a disk drive in accordance with one embodiment of the invention.
Figure 2:
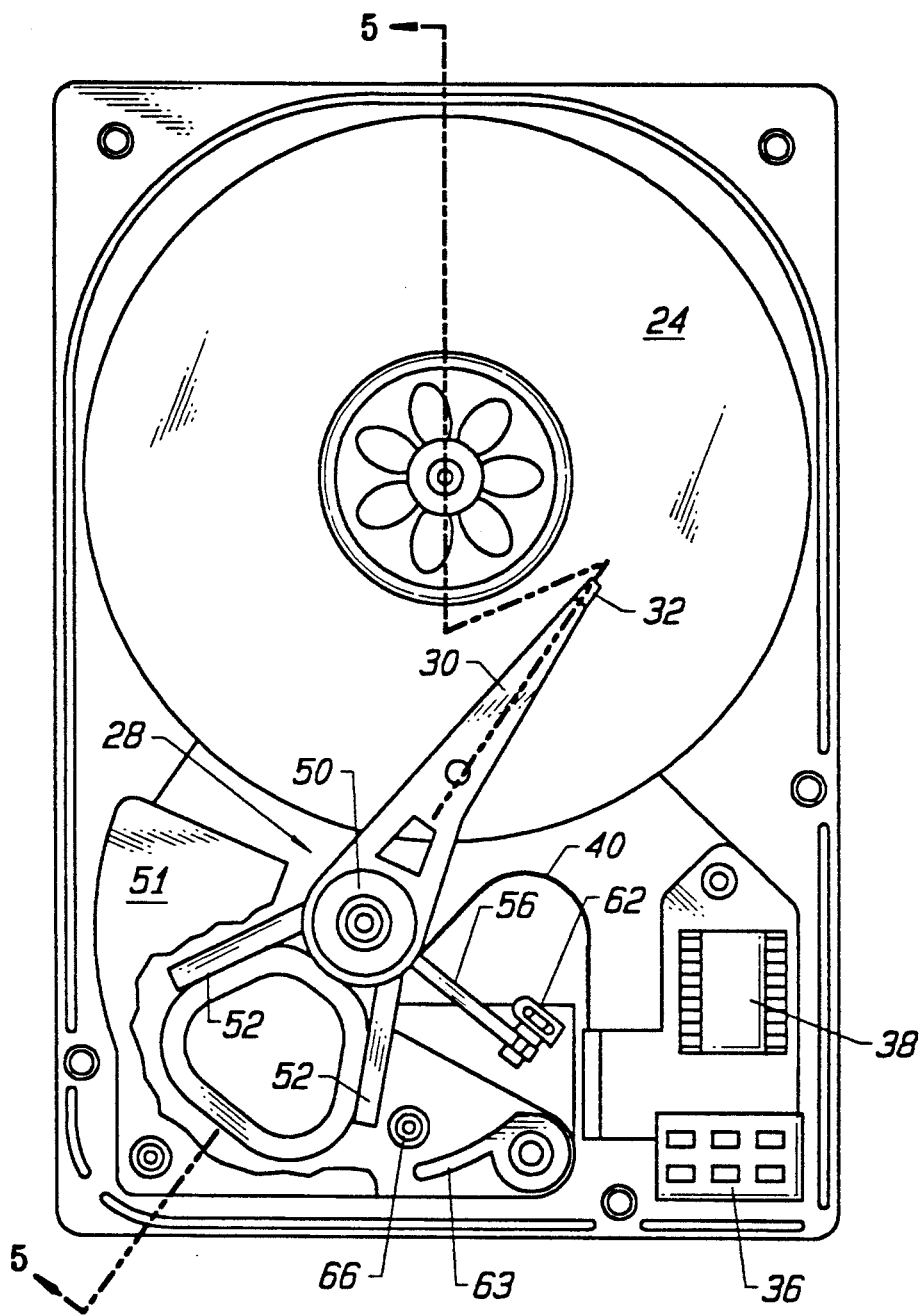
FIG. 2 is a plan view of the disk drive of FIG. 1 with the cover removed.

Referring now to the drawing, FIG. 1 is an exploded perspective view of a disk drive in accordance with one embodiment of the invention, and FIG. 2 is a plan view of the disk drive with the cover removed. The disk drive has the form factor of $4'' \times 2\frac{3}{4}'' \times 0.60''$, with a single disk providing data storage. The length of the drive is approximately the width of a three and one-half inch drive and the width is approximately one-half of the length of a three and one-half inch drive. The dimensions of the disk drive are: length 4 inches; width $2\frac{3}{4}$ inch; and height 0.6 inch. Further, one embodiment of the disk drive weighs less than approximately six (6) ounces. Implementing the disk drive in a plug-in module allows the disk drive to be easily transferred from one computer to another and to be used in lap-top and notebook computers.

In FIG. 1 the cover 10 and base 12 are made from cast aluminum alloy material with bearing surfaces thereof machined to provide a proper fit. A printed circuit board 14 on the bottom of base 12 has circuitry for operating the disk drive. In achieving the 0.60 inch overall height, all components are mounted on one surface of the circuit board away from the drive base 12. The cover 10 mates with the base 12 with screws (not shown) inserted through holes 16 in cover 10 and threadably engaging holes 18 in the base 12. Slots 20 in the printed circuit board 14 receive mounting posts 22 extending from the base 12. Connector 15 at one end of printed circuit board 14 connects with the computer system.

A single disk 24 is fastened to a spin motor by clamp 26. As the disk is rotated by the spin motor an actuator 28 having two arms 30 move pick-up heads 32 mounted at the end of arms 30 across the two surfaces of the disk 24 for recording and retrieving data. Actuator 28 includes a magnetic assembly shown generally at 34 for driving the heads across the disk surfaces. The actuator assembly will be described in more detail with reference to FIG. 3.

A header 36 interconnects actuator interface circuitry 38 with the control circuitry on printed circuit board 14. The interface circuitry 38 is interconnected with the voice coil motor of actuator 28 through flexible ribbon cable 40.

FIG. 2 is a plan view of the disk drive with the cover removed and with the magnetic top plate 51 partially removed to further illustrate the actuator assembly. An actuator body 50 is rotatably mounted in a recessed portion of the drive base 12 of the disk drive with the actuator body including support arms 52 for the voice coil 54. A crash stop arm 56 extends from the actuator body and supports a latch plate 58 which engages the latch body 62 to limit the inward travel of the arm 30 and head 32. The latch plate comprises magnetically permeable material which can be yieldably retained by a magnet 64 in a housing of the latch body 62 when the actuator assembly is in a locked position while the disk drive is not operating. A second crash stop comprising a plastic tube 66 limits the outward movement of suspension 30 and head 32. The tube 66 can be removed to facilitate movement of the suspension 30 and head 32 out off of the disk location when the disks 24 are removed from the drive. Member 63 is a shield in the magnetic structure of the actuator.

Figure 3:
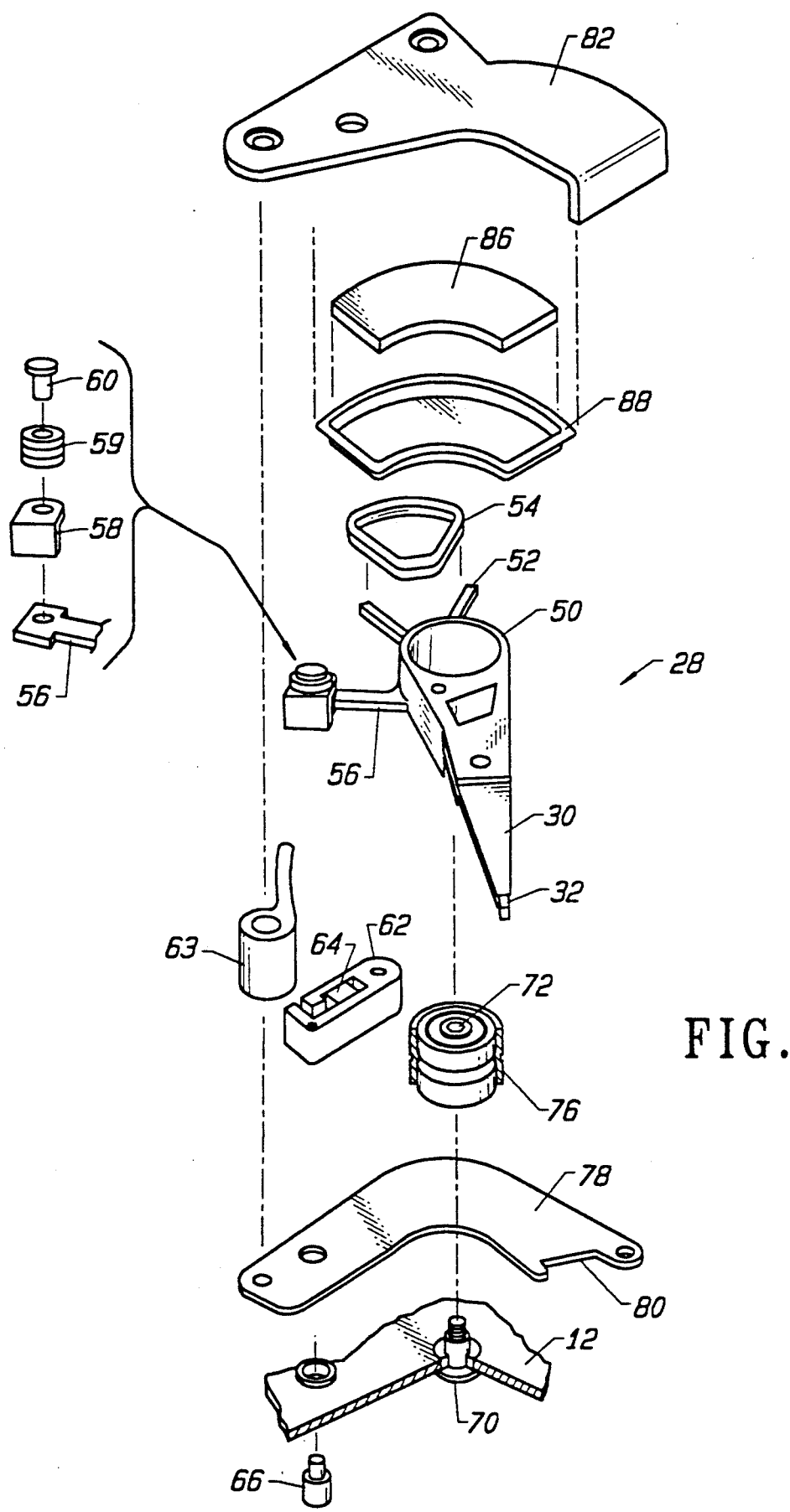
FIG. 3 is an exploded perspective view of the head actuator assembly of the disk drive of FIG. 1.

Referring now to FIG. 3, an exploded view of the actuator 28 is illustrated. The actuator is mounted on a plug insert 70 which engages a hole 71 in the base 12 in a forced fit. The plug insert 70 has a threaded end which is threadably engaged by a shaft 72 having a slotted end portion. Shaft 72 supports two bearings 74 within a housing 76 (shown in section). Housing 76 is received by the actuator base 50 thereby allowing the actuator base to rotate on the bearings around the stationary shaft 72 and insert 70.

The magnet assembly includes a bottom plate 78 having a notch 80 in one end thereof. A top plate 82 has a projection 84 which mates with the notch 80 of bottom plate 78. A magnet 86 is affixed to the bottom surface of top plate 82 by a suitable adhesive such as Loctite with a magnetic shield 88 provided over the magnet. The magnet is preferably a rare earth material and the shield 88 is made of aluminum. Bottom plate 78, top plate 82, and member 63 provide a path for magnetic flux from magnet 86 through coil 54.

The latch plate 58 fits in a grommet 59 which is fastened to arm 56 by means of pin 60. The latch plate 58 engages latch body 62 when the head 32 is rotated to the innermost limit of travel.

Figure 4:
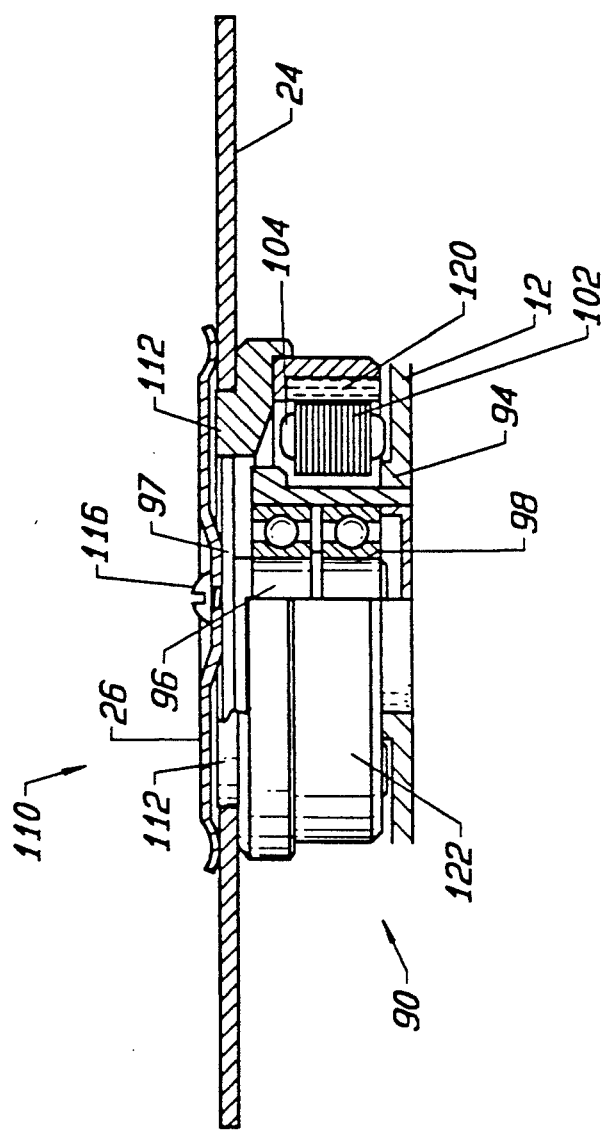
FIG. 4 is a side view partially in section of the spin motor in the disk drive of FIG. 1.

FIG. 4 is a side view partially in section of the spin motor for driving the disks. A bearing housing 92 is adhesively bonded to a shoulder 94 in the base 12. A shaft 96 supports two bearings 98 and 100 in the bearing housing 92. Mounted around the outside of bearing housing 92 is a lamination assembly 102 which supports nine coils 104. The coils are energized by the control circuitry on printed circuit board 14 to rotate a spindle shown generally at 110 mounted on the shaft 96. The motor operates as brushless DC motor in which armature (coil) assembly is stationary.

Spindle 110 includes a hub 112 on which are mounted the disk 24. The disk is maintained on hub 112 by means of clamp 26 which is affixed to the shaft by screw 116. The width of the spokes of clamp 26 determine the pressure exerted on the disks, and thickness of the spokes determines the yield or "spring" of the clamp. Hub 112 engages flange 97 of shaft 96 in an interference fit.

A six pole annular magnet 120 is affixed to hub 112 by means of a housing 122 of highly permeable low carbon steel. The housing is affixed to the hub by means of adhesive. Energization of the coils 104 drives the magnetic ring 120 and the spindle 110 to which the ring is affixed.

Figure 5:
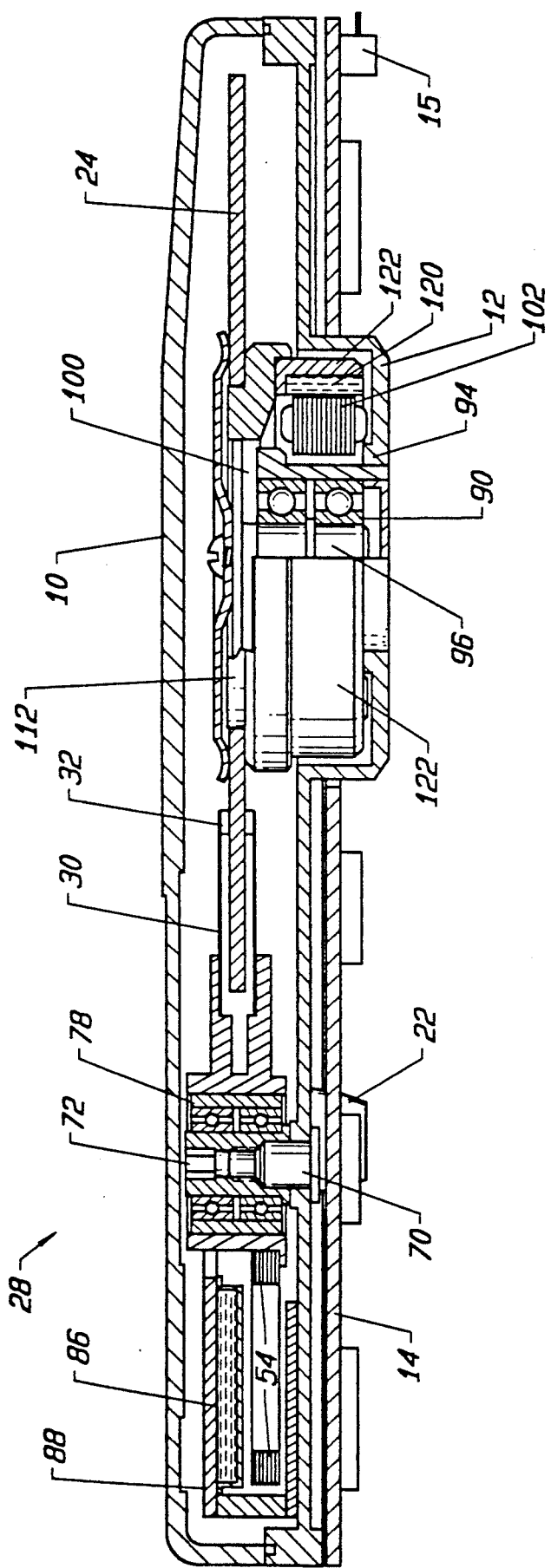
FIG. 5 is a section view of the disk drive taken along the line 5—5 in FIG. 2.

FIG. 5 is a side view in section taken along the line 5—5 of FIG. 2 to illustrate the actuator assembly 28 and the spin motor. The actuator motor is mounted on plug insert 70 mounted through base 12. The actuator assembly includes two suspensions 30 and heads 32 each accessing a side of the disk 24. Printed circuit board 14 is mounted on the bottom of base 12 with the disk drive supported by post 22 and the shoulder 94 which receives housing 92 of the spin motor.

Figure 6:
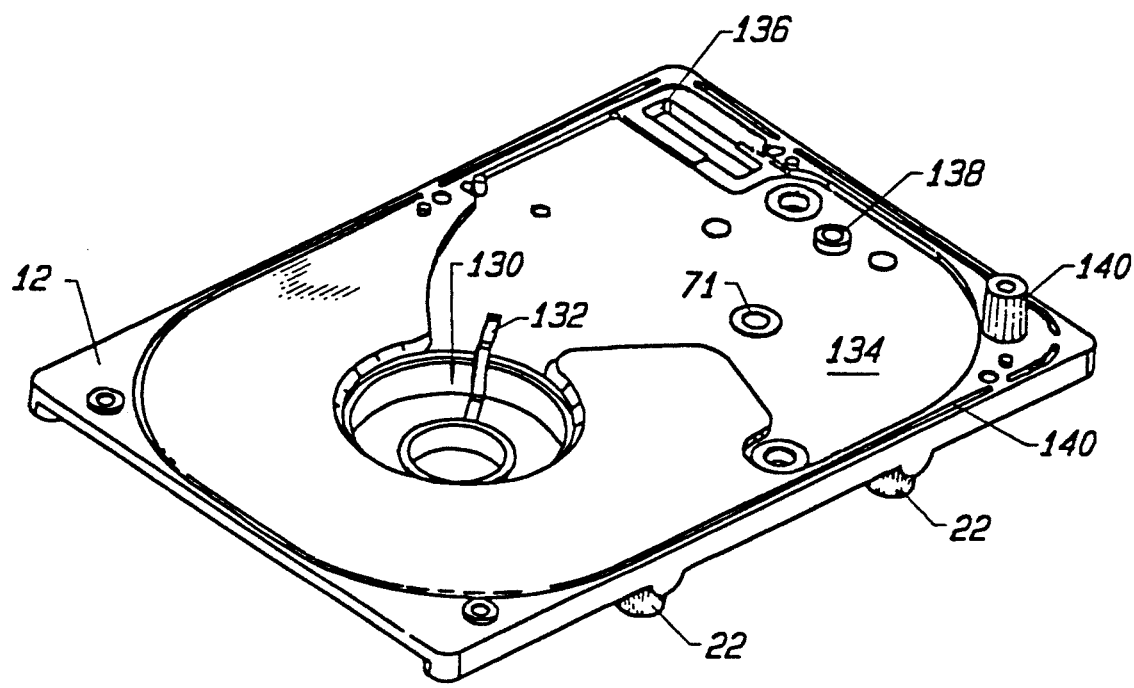
FIG. 6 and FIG. 7 are top and bottom perspective views of the base of the disk drive of FIG. 1.
Figure 7:
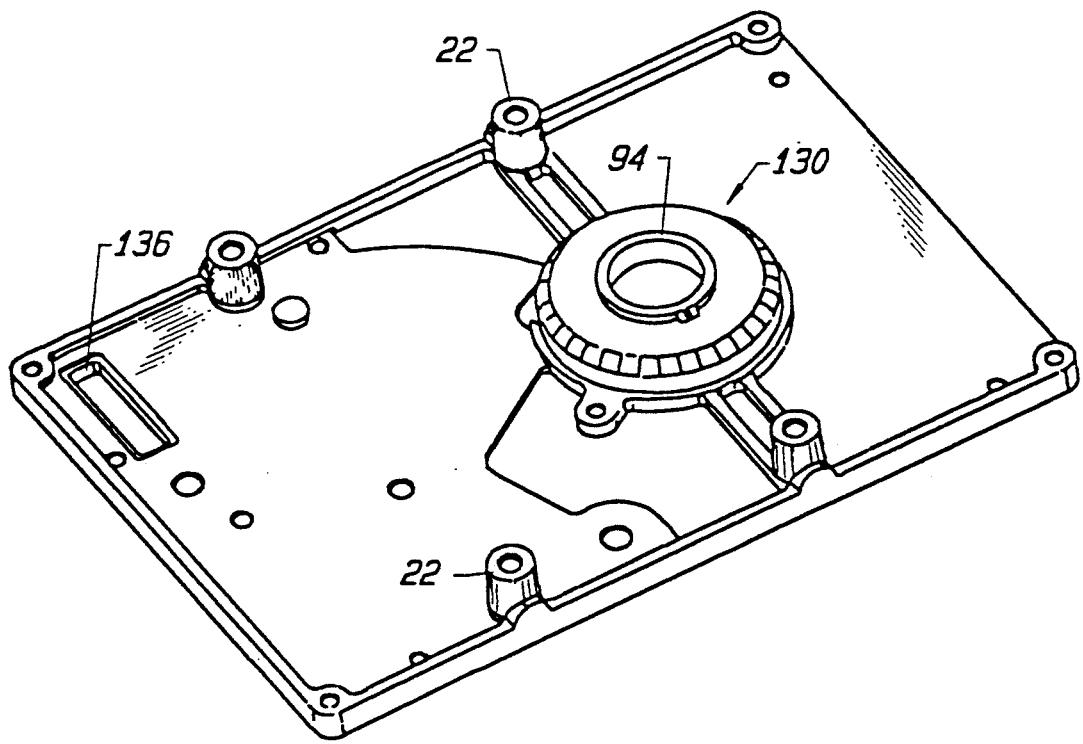

FIGS. 6 and 7 are top and bottom perspective views of the base 12 of the disk drive. The base includes a recessed area 130 for receiving the spin motor with ribbon cable 132 providing electrical connection to the motor. A recessed surface portion 134 receives the bottom plate of the actuator with hole 71 receiving the plug insert 70 of the actuator. Opening 136 accommodates the header 36 (FIG. 1), and hole 138 is for engaging and receiving the O.D. crash stop. A recessed portion 140 around the periphery of the base receives a gasket which provides a seal between the base and cover. As noted above, the base 112 as well as the cover 10 are preferably formed from cast aluminum alloy with the support surfaces machined to accommodate the spin motor, actuator, and other parts mounted to the base.

Figure 8:
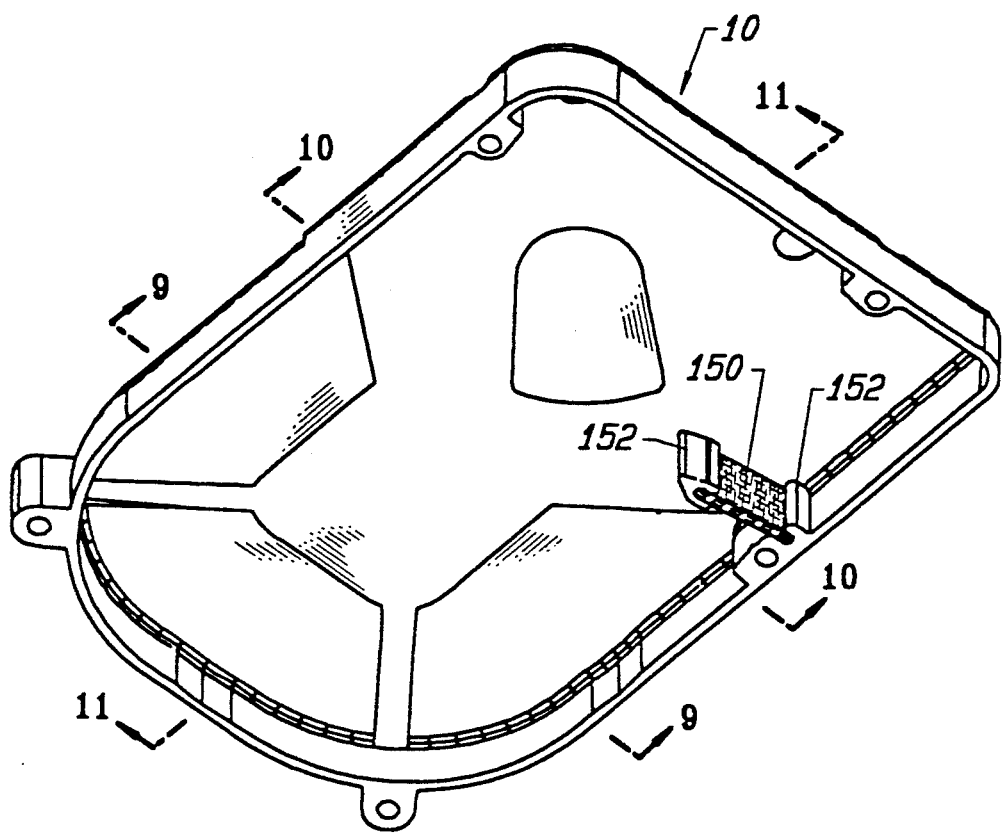
FIG. 8 is a perspective view of the cover of the disk drive of FIG. 1.
Figure 9:
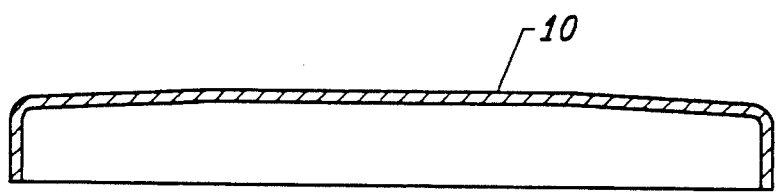
FIGS. 9-11 are section views through the cover of FIG. 8 taken along the lines 9—9, 10—10, and 11—11, respectively.
Figure 10:
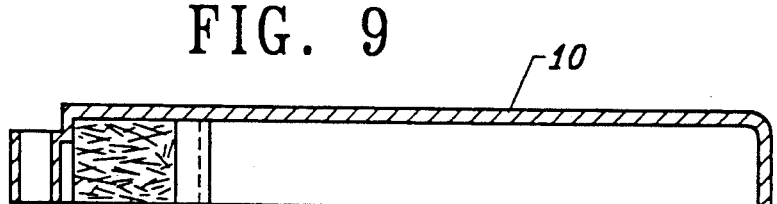
Figure 11:
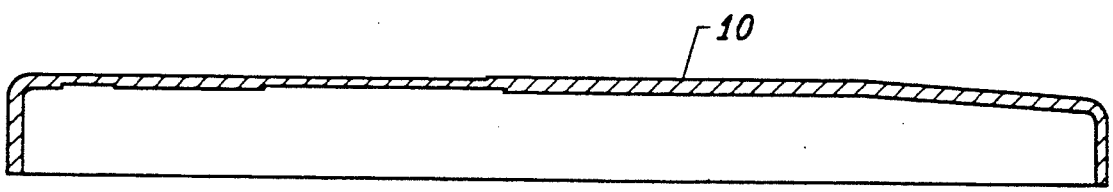

FIG. 8 is a perspective view of the cover 10. A filter material 150 is supported within the cover between supports 152. Air currents created by the rotating disks pass through filter 150 for the removal of particulate matter. FIGS. 9 and 10 are cross-sectional views of the housing taken along the lines 9—9 and 10—10; and FIG. 11 is a longitudinal sectional view of the cover taken along the line 11—11. The sectional view along the line 9—9 is generally above the spinning disks, and it will be noted that the cover bulges outwardly thereby increasing the strength to external pressure changes and in effect forming a Bellville type spring. The section view along the line 10—10 away from the disks is generally flat as noted in FIG. 10.

There has been described a compact and light weight disk drive having a plurality of two and one-half inch disks. The disk drive has increased data storage capacity (40 Mb for the single disk) with the overall power consumption of the disk drive being less than 3.5 watts and as low as 1.5 watts during idle periods. Thus the disk drive is readily interchangeable in computers and lends itself to both lap-top and pocket computers.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

I claim:

1. A disk drive having a length, a width, and a height, comprising a base, a cover configured to mate with said base and define a chamber having a controlled environment, said cover having a length and a width, and a convex cross section over the width of the cover extending outwardly from said base thereby enhancing the strength of said cover and said controlled environment to atmospheric pressure changes, said base and cover conforming to a form factor in which the length of the drive is approximately the width of a three and one-half inch drive, the width is approximately one-half of the length of a three and one-half inch drive, and the height is approximately 0.60 inch, a single-disk magnetic storage medium rotatably positioned in said chamber, a spin motor mounted to said base and having a spindle for rotatably supporting said single disk storage medium, actuator means including a rotary voice coil motor mounted to said base, a plurality of suspensions extending from and driven by said rotary voice coil motor, and a plurality of pick-up heads with each head mounted to an end portion of an extension for movement across a surface of the storage medium for recording and accessing data magnetically stored on the surface, latch means for securing said suspensions and heads over a non-data region of the storage medium, and circuit means for controlling said actuator means in recording and accessing data.

2. The disk drive as defined by claim 1 wherein said cover and said base are cast aluminum alloy.

3. The disk drive as defined by claim 1 wherein said base includes a recessed portion in which said spin motor is mounted.

4. The disk drive as defined by claim 1 wherein said actuator means includes a inner crash stop and an outer crash stop for limiting the travel of said actuator and said pick-up heads across the surface of said single disk magnetic storage medium.

5. The disk drive as defined by claim 4 wherein said inner crash stop includes a latch body and a magnet housed in said latch body, said actuator means further including a crash stop arm and a latch plate for engaging said latch body, said latch plate comprising magnetically permeable material for magnetic attraction by said magnet.

6. The disk drive as defined by claim 5 and further including a grommet on which said latch plate is mounted and means for fastening said grommet on said crash stop arm.

7. The disk drive as defined by claim 1 wherein said circuit means comprises a printed circuit board mounted to one side of said base opposite from said cover.

8. The disk drive as defined by claim 7 wherein said circuit board includes a plurality of components mounted on a side of said circuit board opposite from said base.

9. The disk drive as defined by claim 1 wherein said actuator means comprises an insert supported by interference fit in a hole in said base, a shaft threadably engaging said insert, a plurality of ball bearings mounted on said shaft, a housing for said ball bearings, an actuator body supported around said housing, said plurality of arms extending from said actuator body, a magnetic assembly including a bottom plate and a top plate defining a closed magnetic flux path, a magnet supported by said top plate between said top plate and said bottom plate, and a voice coil supported by said actuator body and positioned in juxtaposition with said magnet between said top plate and said bottom plate.

10. The disk drive as defined by claim 9 and further including a crash stop arm extending from said actuator body, a latch plate supported at one end of said crash stop arm, and magnet means supported by a latch body fastened to said base for yieldably magnetically latching said latch plate.

11. The disk drive as defined by claim 9 wherein said spin motor includes a shaft, first and second ball bearings mounted on said shaft, a bearing housing in which said bearings are housed, said housing engaging a shoulder in a recessed portion in said base in interference fit, a lamination body positioned around said bearing housing, a plurality of coils supported on said lamination body, a hub supported by said shaft, said hub supporting said multi-disk storage medium, and an annular magnet supported by said hub and rotatably positioned around said coils.

12. The disk drive as defined by claim 11 wherein said ball bearings have the same size balls.

13. A disk drive comprising
    a base,
    a cover configured to mate with said base and define a chamber having a controlled environment,
    said base and cover conforming to a form factor in which the length of the drive is approximately the width of a three and one-half inch drive, the width is approximately one-half of the length of a three and one-half inch drive, and the height is approximately 0.60 inch,
    a single-disk magnetic storage medium rotatably positioned in said chamber,
    a spin motor mounted to said base and having a spindle for rotatably supporting said single disk storage medium,
    actuator means for positioning a plurality of suspensions having mounted thereon a plurality of read/write heads across a surface of the storage medium for recording and accessing data magnetically stored on the surface, said actuator means including an inner crash stop and an outer crash stop for limiting the travel of said suspensions and said pickup heads across the surface of said single disk magnetic storage medium, said inner crash stop including a latch body and a magnet housed in said latch body, said actuator means further including a crash stop arm and a latch plate for engaging said latch body, said latch plate comprising magnetically permeable material for magnetic attraction by said magnet, and further including a grommet on which said latch plate is mounted and means for fastening said grommet on said crash stop arm; and
    circuit means for controlling said actuator means in recording and accessing data.

* * * * *